(12) United States Patent
Dalgliesh

(10) Patent No.: US 12,067,001 B2
(45) Date of Patent: Aug. 20, 2024

(54) DEFERRED COMPUTATION OF ENTITY STATES IN A SOFTWARE PLATFORM

(71) Applicants: Atlassian Pty Ltd., Sydney (AU); Atlassian Inc., San Francisco, CA (US)

(72) Inventor: Eric Dalgliesh, New South Wales (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 83 days.

(21) Appl. No.: 17/855,602

(22) Filed: Jun. 30, 2022

(65) Prior Publication Data
US 2024/0004868 A1 Jan. 4, 2024

(51) Int. Cl.
*G06F 16/00* (2019.01)
*G06F 16/23* (2019.01)
*G06F 16/25* (2019.01)
*G06F 16/953* (2019.01)

(52) U.S. Cl.
CPC ........ *G06F 16/2379* (2019.01); *G06F 16/252* (2019.01); *G06F 16/953* (2019.01)

(58) Field of Classification Search
CPC ... G06F 16/2379; G06F 16/252; G06F 16/953
See application file for complete search history.

(56) References Cited

U.S. PATENT DOCUMENTS

| | | | | |
|---|---|---|---|---|
| 2006/0023730 | A1* | 2/2006 | Regan | H04H 60/25 370/432 |
| 2009/0171679 | A1* | 7/2009 | Salgado | G06Q 30/0281 705/346 |
| 2010/0023562 | A1* | 1/2010 | Kreuch | G06F 16/1873 707/E17.008 |
| 2012/0011496 | A1* | 1/2012 | Shimamura | G06F 9/44521 717/170 |
| 2014/0365428 | A1* | 12/2014 | Snaman, Jr. | G06F 16/128 707/609 |

* cited by examiner

*Primary Examiner* — Syed H Hasan
(74) *Attorney, Agent, or Firm* — Brownstein Hyatt Farber Schreck, LLP

(57) ABSTRACT

A software platform includes a frontend and a backend application instance. A user can operate the frontend to modify a data object stored in a database of the backend application instance. The data object may be associated with a higher-order object, referred to as an entity of the software platform. One or more data consumers (e.g., search engine indexing services) may require as input a full computed state of platform-level objects such as entities. The software platform defers computation of entities until necessary by inserting work items into a work item queue that reference entities in need of full state computation. Worker nodes wait specified deferral periods before computing full entity states and transmitting the full computed states to the one or more data consumers, thereby significantly reducing redundant computation of full entity states.

18 Claims, 5 Drawing Sheets

DEFERRED COMPUTATION OF ENTITY STATES IN A SOFTWARE PLATFORM

TECHNICAL FIELD

Embodiments described herein relate to system architectures supporting guaranteed delivery of data in software platforms and, in particular, to systems, architectures, and computationally-efficient methods of scheduling and performing, by a software platform, a computation of a full entity state.

BACKGROUND

A software platform typically stores data objects associated with the platform in a database. In some conventional architectures, multiple individual data objects can cooperate to define higher order data objects. In such constructions, each update to each individual data object triggers an update for each associated higher-order data object.

In many cases, especially for software platforms supporting many users and storing many high order data objects, calculating current states for each object in response to each change of each data object is computationally inefficient and can reduce performance of the software platform and/or one or more features of the software platform, such as a search feature.

SUMMARY

Embodiments described herein can take the form of a system for serving a structured data representation of a full computed state of an entity of a software platform to a consumer of the full computed state of the entity on a deferred basis. The system can include a host server including at least a memory resource storing an executable asset and a processing resource operably coupled to the memory resource. The processing resource can be configured to retrieve the executable asset from the memory resource to instantiate an instance of a backend application supporting the software platform. The backend instance can be configured to communicably couple to one or more instances of the frontend application that may be operated by a user of the software platform.

In addition, the backend application may be configured to receive an update to a data object associated with the entity. For example, although not required, the update may be received from the frontend application. The backend application can be further configured to perform operations such as, but not limited to: causing the update to the data object to be committed to a backend database of the software platform; incrementing a version number associated with the entity; and creating an identifier identifying the entity and the version number in a work item queue.

The system can also include a worker node instance configured to pop a work item from the work item queue, such as the work item with the identifier and the version number. Thereafter, the worker node instance can, in accordance with determining that the version number is not the highest version number among all work items in the work item queue that comprise the identifier, discard the work item.

Alternatively, in accordance with determining that the version number is the highest version number among all work items in the work item queue that comprise the identifier, the worker node instance can be configured to compute the full state of the entity and, thereafter, serve the full computed state to the consumer (e.g., a search engine service).

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
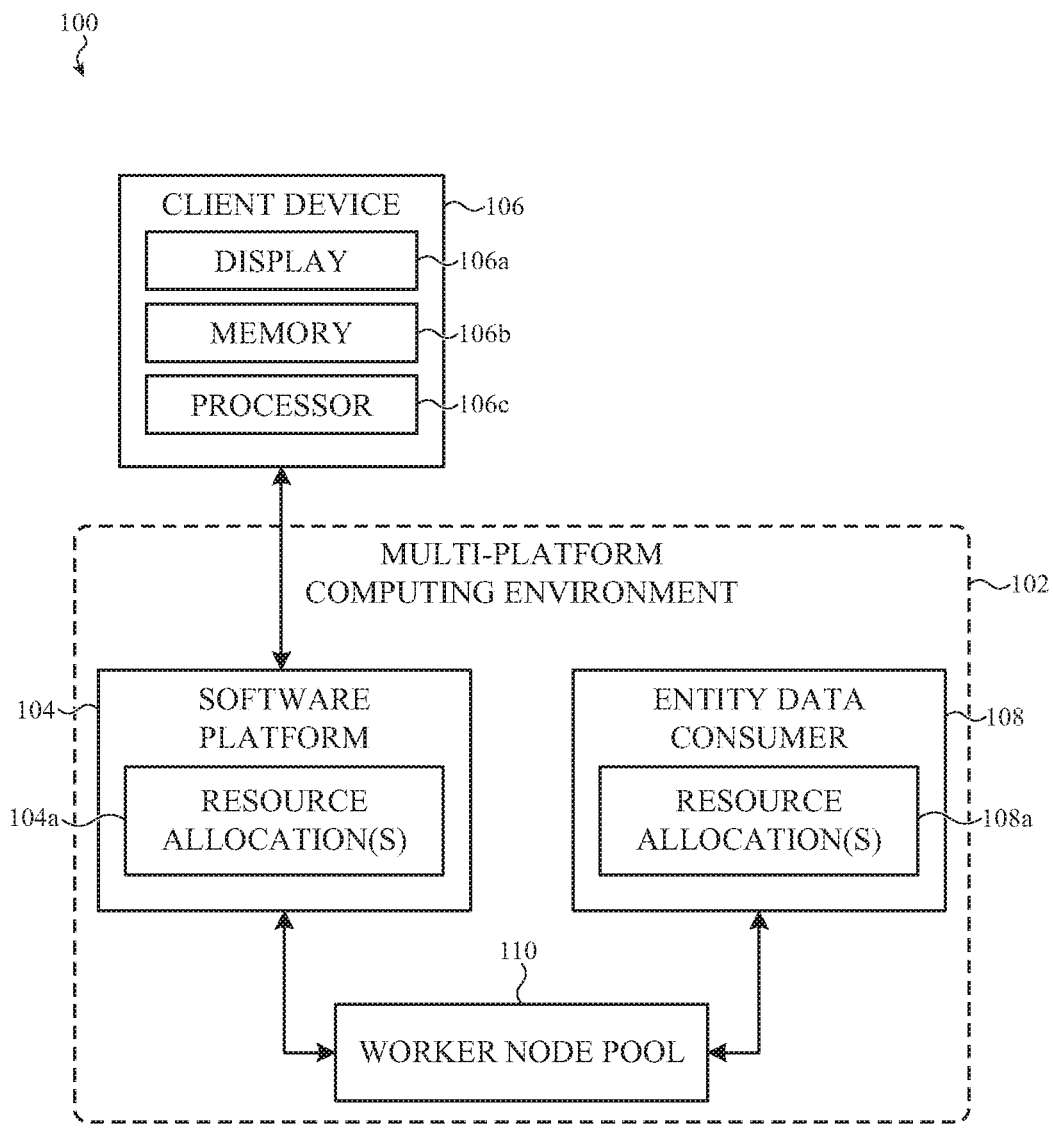
FIG. 1 depicts a multiplatform computing environment including a software platform configured for efficiently-deferred computation and guaranteed delivery of entity states to one or more entity data consumers, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for storing and retrieving platform-level aggregate data objects (herein "entities") that may be created, modified, or updated when leveraging software as a service (herein a "software platform" or, more simply, a "platform"). An entity may be updated, created, or modified by a user operating a frontend of a software platform, an administrator operating a frontend or a backend of the software platform, or by operation of the software platform itself (e.g., an automatic or scheduled update). These examples are not exhaustive; a person of skill in the art may appreciate that a platform-level data object may be created, modified, or updated in a number of suitable ways and/or in response to a number of inputs or events.

A platform entity (or "entity") as described herein can be a meta object formed, built, structured, or otherwise based on a number of lower-level data objects which, in turn, may be stored in one or more data stores, databases, or tables of a software platform. In another non-limiting phrasing, an entity or "data entity" as described herein is (typically) a platform-level object or high-order object that links to, aggregates, combines, or is otherwise associated with or based on one or more lower-level data objects.

For example, a document entity of a documentation system can be associated with text content, media content, metadata, files, and so on each of which may be stored in different tables, databases, data stores, and so on. In this example, a document entity may be a collection, association, or aggregation of specific lower-level data objects, arranged or structured in a particular way.

In another example, a project entity of an issue tracking system can include one or more task lists, which in turn can include one or more tasks, and so on. Each of these items may be stored in different databases or database tables; database architectures vary from embodiment to embodiments.

More broadly, a person of skill in the art may understand that, as used herein, the term entity refers to a high-order, platform-level, object typically specific to a particular software platform (and/or compliant with a particular form or format, such as a document format) that is based on or assembled form one or more lower level data objects that may be independently stored in, organized in, and accessed from different databases or database tables or locations. It may be appreciated that in different embodiments, different platforms may define entities and/or data objects that make up those entities differently; implementations may vary from embodiment to embodiment.

As may be appreciated by a person of skill in the art, a software platform—however configured—may from time to time serve structured data representations (e.g., JSON objects, XML documents, HTML documents, and so on) that represent a current state of a given platform-specific entities to a number of different endpoints.

Broadly, a software platform can be configured to communicably couple to one or more instances of an associated frontend software so as to serve entities—and/or structured data representations thereof—to one or more users of the software platform. For example, a documentation system can be configured to serve document entities (which aggregate different data objects associated with the entity from different databases or tables) to end users operating a frontend associated with the documentation system. Likewise, an issue tracking system can be configured to serve project entities to end users operating a frontend associated with the issue tracking system.

In other examples, entities may be served to other (non-user) endpoints, such as other software services or platforms. As one example, a documentation system may serve or otherwise provide one or more entities to a search service for indexing configured to provide a search functionality over content stored by the documentation system.

In another example, an issue tracking system may serve or otherwise provide one or more entities to a notification system configured to periodically notify one or more users of the issue tracking system of an event or of information relating to the issue tracking system or a use thereof.

For simplicity of description and illustration, endpoints to which an entity may be served or otherwise provided by a software platform as described herein are referred to, collectively, as "data consumers" or "entity consumers" or more generally, "consumers" of entity data. In this manner, a software platform as described herein can be communicably coupled to one or more user-consumers of data and, additionally, to one or more non-user consumers of data. For simplicity of description, the examples that follow reference constructions in which a consumer is a non-user consumer, but it may be appreciated that this is merely one non-exhaustive example.

In addition, in some embodiments, a software platform may be configured to support guaranteed delivery of computed full states of entities to one or more consumers. As used herein, the term "full state" or "full computed state" refers to a structured data representation of a particular entity, incorporating information as appropriate from all associated data objects. For example, a full computed state of a document entity of a documentation system may be a single JSON object or HTML file that incorporates all inline multimedia, text, styles, scripts, and so on associated with that entity. In a more broad phrasing, a full computed state of an entity can represent a snapshot of that entity, including content associated to that entity regardless of form, source, or format, at a particular time. In this manner, as soon as a single data object associated with an entity changes or is updated, an entity's full computed state becomes out of date.

In some constructions, a software platform may be configured to regularly recompute a full state of an entity each time any data object associated with that entity changes. Upon re-computation of the full state, the software platform may be configured to serve and/or otherwise provide the updated full entity state to one or more consumers.

However, as noted above, such constructions are often difficult to scale and often consume significant computational resources and network bandwidth resources. As may be appreciated, these constructions may be particularly problematic as software platforms support more and more users and as platform entities become associated with more and more individual data objects. In either case, updates to full computed states of each entity may be triggered at an unnecessarily frequent pace. For example, many conventional constructions recompute full entity states for each change to each data object. In some constructions, each received change to each data object is journaled (or otherwise queued). Thereafter, in first-in-first-out order, a conventionally architected system computes new full states for each change. In this manner, if five different data objects associated with a particular entity are changed, each of the five changes will be journaled and the full state of the associated entity will be computed five separate times and each of these computed states will be independently served to one or more consumers (e.g., five separate notifications of state change for each consumer).

More broadly, conventional journaling-based systems trigger computationally-expensive full-state computation operations on an unnecessarily frequent basis, thereafter unnecessarily consuming limited bandwidth resources to communicate each full-state computation to each associated consumer.

To address these and other deficiencies of such constructions, embodiments described herein defer computation of full states of certain entities. As a result of these constructions, duplicative state computation operations are significantly reduced, as are duplicative operations of reporting updated full states to one or more consumers. Further still, the systems described herein may be significantly simpler in architecture and may present a reduced administrative oversight burden when compared to conventional full-state computation journaling systems.

More particularly, embodiments described herein are configured to receive (at a backend of a particular software platform, in many embodiments) an update to a particular data object stored by the software platform. The data object, as with other embodiments described herein, may be associated to one or more higher-order entities. For example, the update may be a change to a text paragraph of a document entity tracked by a documentation system. In other examples, the update may be a status change of a task of a task list associated with a project entity of an issue tracking system.

Once an update (the term "update" encompasses any change, modification, addition, deletion or other manipulation or augmentation of data) to a particular data object, which may be triggered by a user input to a frontend of the software platform, is received at the backend of the associated software platform, the software platform can immediately commit that change to an appropriate database of the software platform (e.g., media updates may be stored in a media-specific database, plaintext updates may be stored in a plaintext database, and so on; many different data architectures are possible).

In certain constructions, the software platform may enqueue the operation to commit the update to a database in a queue, but for simplicity of description the embodiments that follow reference implementations in which the backend immediately commits any change to an appropriate internal (or external database).

In addition to committing the change to the data object, the backend may be also configured to determine one or more entities that are associated to the updated data object. In traditional constructions, as noted above, the full states of each of these entities would typically be immediately computed in view of the change to the associated data object and thereafter immediately served to one or more consumers. As noted above, such operations often unnecessarily waste processing resources, memory resources, and bandwidth resources especially in circumstances in which one or more users update multiple data objects associated with the same entity near in time with one another.

By contrast, embodiments described herein configure a backend system to, in response to any update to any data object, collect identifiers of one or more entities that reference the updated data objects. In addition, for each entity, a version number associated with that entity (which may be stored in a version number database or table, associating globally or locally unique identifiers identifying particular entities with version numbers of those entities) may be incremented.

Thereafter, each respective entity identifier and each respective entity version number can be included as attributes of a structured data object. As one example, such a data object may be structured as a JSON object having two or more attributes arranged in key-value pairs:

```
{
    "entity_id" : "2b10f480-c90b-475e-8775-eb3d35fe01fa",
    "version" : 0.12345
}
```

In some cases, the structured data object may also reference an identifier associated with a data object that triggered the backend to initiate the previously described process:

```
{
    "entity_id" : "2b10f480-c90b-475e-8775-eb3d35fe01fa",
    "basis" : "object_id_7788",
    "version" : 0.12345
}
```

In some cases, references to the data object and/or the entity id may be hashed, encrypted, or otherwise used as input to a deterministic function.

In some cases, a different structured data object may be added for each of a set of different consumers:

```
[{
    "entity_id" : "2b10f480-c90b-475e-8775-eb3d35fe01fa",
    "basis" : "object_id_7788",
    "version" : 0.12345,
    "consumer" : elastic_search,
},
{
    "entity_id" : "2b10f480-c90b-475e-8775-eb3d35fe01fa",
    "basis" : "object_id_7788",
    "version" : 0.12345,
    "consumer" : notification_module,
}]
```

These structured data objects can each be added to a queue, list, or array data structure which may also in some embodiments be implemented as a JSON object:

```
[{
    "entity_id" : "2b10f480-c90b-475e-8775-eb3d35fe01fa",
    "version" : 0.12345
}{
    "entity_id" : "ba31ebaa-4a8b-4e30-b6ac-8ec851021813",
    "version" : 1.1.2.3.444b
}
{
    "entity_id" : "142b9178-1087-48db-82f6-826a5d47b0f3",
    "version" : 1000
}
{
    "entity_id" : "b40f8520-97a1-4461-83dd-ecc835616e01",
    "version" : 76
}]
```

In some cases, one or more of the items of such an array or queue may be associated with additional data or metadata such as a time at which the item was added to the array:

```
{
    "entity_id" : "2b10f480-c90b-475e-8775-eb3d35fe01fa",
    "version" : 0.12345,
    "timestamp" : "2023-05-25 09:53:30"
}
```

The foregoing examples are not exhaustive; it may be appreciated that any suitable data can complement one or more entity identifiers or version strings (which may be numbers or alphanumeric strings or any suitable versioning schema) as described herein.

This queue as described herein is referred to as a "work item queue" that is accessible by one or more worker nodes, which may be instances of software executing over one or more processing and memory resources. More specifically, a worker node—which may be one of a pool of worker nodes, each instantiated by the same or different processing resources and memory resources—may be configured to periodically access the work item queue (and/or the backend system) in order to obtain therefrom at least one work item (such as shown and described above).

On receiving a new work item, the worker node can traverse the work item queue (and/or submit a query to a controller managing the work item queue) to determine whether the same entity referenced in the work item is referenced in other work items still in the work item queue. In a circumstance in which the entity is referenced by other work items, version numbers can be compared and expired version number (e.g., version numbers that are not associated with the "most recent" version of a particular entity) can be discarded. Upon determining, by a worker node, that a particular work item does reference the most current version of the entity, the worker can compute the full state of that entity. Once the full state is computed, one or more registered or otherwise known consumers of that entity's state can be served with the computed state.

In some cases, version numbering and analysis may not be required; instead, a worker node and/or a backend as described herein may be configure to determine whether the same entity id is referenced more than once in the same work item queue.

In a more general and broad phrasing, for embodiments described herein, computation of a full entity state is deferred until a worker node accesses an associated work item and computes the state. In this manner, many updates to different data objects associated with a single entity can be received within a given time interval, after which the full state of the entity (incorporating all changes received in the interim since the last full state computation) are incorporated.

In some cases, worker nodes can operate in a repeating loop; once one work item is completed, a next work item can be immediately requested and another entity's state can be computed by accessing all data objects associated with the entity from the backend's various databases, stores, or tables and appropriately computing the aggregate state that represents the entity.

In other cases, and in many embodiments, worker nodes may only request work items (and/or may be permitted to access work items) on a schedule and/or after particular delays or at specific intervals. These intervals may be based on the entity, the software platform, one or more data consumers, and/or based on historical data.

For example, in some cases, an interval at which a particular entity state is computed by a worker node may be based, at least in part, on the entity itself. The interval may be based on metadata of the entity, such as how often the entity's state has been historically computed; the more frequently the entity's state changes, the longer the system may delay before permitting a worker node to compute the full state of the entity. In other cases, if a particular entity is not regularly accessed or needed in a particular software platform, computation of its updated state may be deferred for an extended period of time.

In other cases, an interval at which a particular entity state is computed by a worker node may be based, at least in part, on a consumer associated with that entity. For example, the interval may be faster/more frequent if the entity is associated to a search engine indexer service (an example of a consumer), than if the entity is associated to a quarterly reporting service.

The foregoing embodiments are not exhaustive; it may be appreciated that any suitable information can be used to determine an amount of deferral of computation of particular entity states. For example, deferral decisions may be based, at least in part, on particular consumers, particular entities, particular entity metadata, and so on.

More broadly in view of the foregoing example embodiments, it may be appreciated that a software platform as described herein can include a frontend and a backend configured to communicably couple over a network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor resource or allocation and memory resource or allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, as known to a person of skill in the art, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval as a portion of an entity associated with the software platform.

One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

A system as described herein can also include on or more consumers, which can be communicably coupled to the backend application. The consumers can be, as one example, indexing services that periodically request full entity states to as to update one or more indexes. A consumer as described herein may be a subprocess of the backend application instance, but this is not required; in some constructions a consumer as described herein can communicably couple to a frontend or a backend application instance via a network, which may include the open Internet or a private intranet.

A system as described herein can further include at least one worker node. In some constructions, a worker node is an ephemeral instance of software provisioned in a cloud computing environment. In other cases, a worker node is a serverless function. In other cases, a worker node is an instance of software executing over dedicated hardware resources such as a processing resource or memory resource.

In many cases, the worker node may be one of many similarly or identically configured worker nodes (referred to herein as a "pool" of worker nodes). The pool of worker nodes can be instantiated and/or controlled and/or managed by a worker node controller, which itself may be an instance of software or particularly-configured hardware. In certain constructions, the worker node controller can be configured to select among the pool of worker nodes one or more nodes to perform operations such as described herein. More broadly, the worker node controller may be an orchestration or provisioning controller configured to instantiate, assign work to, and/or decommission one or more worker nodes as described herein.

In view of the foregoing, it may be appreciated that a system as described herein generally and broadly includes a software platform, a work item queue, at least one worker node, and a data consumer. Updates to data objects can be noticed or detected or received by a backend of the software platform, which in response can insert a new work item to the work item queue. The new work item identifies the entity(s) associated with the data object that was updated and, in some constructions, the work item includes a version number for each of the entities. At a later time (which may be determined by the backend system, a worker node controller and/or the consumer), the work item may be popped or otherwise removed from the queue by the worker node or the worker node controller.

First, the worker node may determine whether the received work item corresponds to the most recent version number of the referenced entity. If so, the worker node computes the state of the entity and serves the full computed state to all relevant consumers of the full state of that entity. If the version is not the most recent version number, the work item may be rejected and the worker node may be returned to the pool of available worker nodes.

These foregoing and other embodiments are discussed below with reference to FIGS. 1-4. However, those skilled in the art will readily appreciate that the detailed description given herein with respect to these figures is for explanation only and should not be construed as limiting.

FIG. 1 depicts a multiplatform computing environment including a software platform configured for efficiently-deferred computation and guaranteed delivery of entity states to one or more entity data consumers, such as described herein.

The system 100 includes a multiplatform computing environment 102. The multiplatform computing environment 102 can be operated by an organization having secured a tenancy of one or more software platforms for the organization's employees. In some cases, different platforms of the multiplatform computing environment 102 may be hosted locally within the organization, in other cases, platforms may be provided as cloud services operated over third party infrastructure.

For simplicity of illustration and description, the multiplatform computing environment 102 includes a single software platform, the software platform 104, but it may be appreciated that in other embodiments the multiplatform computing environment 102 can include multiple discrete software platforms each configured for a different purpose.

The software platform 104 can be a collaboration tool such as a documentation system, issue tracking system, messaging system, code repository, and so on. These examples are not exhaustive.

The software platform 104 can be defined by a backend application instance configured to communicate with and exchange data with a frontend application instance. In general, the backend application instance (or more simply, the "backend") can be instantiated over physical or virtual hardware resources associated with and/or allocated to the software platform, such as the resource allocations 104a.

In one example, the resource allocations 104a include a processor resource and a memory resource. The processor resource can be any suitable processing device or combination of processing devices, whether virtual or physical. The memory resource, similarly, can be any suitable memory resource or combination of memory resources. The memory resource can further include one or more databases, data stores, or data tables configured to store information associated with the software platform. For example, and more specifically, the memory resource can be configured to store data objects of the software platform that may cooperate to define one or more entities as described herein.

The memory resource can also store at least one executable asset that may be a set of computer-executable instructions and/or may be compiled binary files. In many configurations, the processor resource can be configured to cooperate with the memory resource to access the executable asset from the memory resource in order to instantiate an instance of the backend application.

As noted above, the backend application can be configured to communicably intercouple with one or more frontend application instances, which may be configured to execute over resources of one or more respective client devices, such as the client device 106.

The client device 106 can be any suitable device, whether portable or stationary, that can be operated by a user of the software platform. As with the backend application instance, the frontend application instance can be instantiated by cooperation of processing and memory resources of the client device 106. Specifically, the client device 106 can include resources such as a display 106a, a memory 106b, and a processor 106c. In this construction, the processor 106c can be configured to cooperate with the memory 106b to access an executable asset therefrom in order to instantiate or support instantiation of an instance of a frontend application of the software platform configured to communicate with the backend application instance. Once instantiated, the frontend application instance can cause the display 106a to render a graphical user interface to display information to a user of the client device 106. The information displayed or rendered the graphical user interface can be based on and/or may correspond to one or more data objects or entities of the software platform stored in a database of the memory resources thereof.

In some cases, the frontend application is a native application. In other cases, the frontend application is a browser application configured to render HTML content served by the backend application instance. A person of skill in the art may appreciate that many constructions are possible.

In this example, a user of the client device 106 can provide credentials through the graphical user interface rendered on the display 106a to authenticate to the software platform 104 or, in particular, to the backend application instance. In some cases, the user's credentials can be supplied to a single-sign-on service of the multi-platform computing environment 102. In response to submitting credentials via the user interface, the client device 106 may receive from the backend application instance (or the single sign-on service or another authentication service, such as an OAuth 2.0 service) a token that can accompany future requests to the backend application instance to authenticate those requests. This is merely one example; simple authentication (e.g., HTTP authentication) or session-based authentication may be used in some embodiments. Other embodiments may not require authentication.

In some cases, role-based authentication may be used in addition to user-based authentication.

Once properly authenticated to the backend system, a user of the client device 106 can provide inputs to the software platform. Some of these inputs may cause one or more data objects stored in one or more databases of the software platform 104 to change, which as noted above may necessitate an update to a full computed state of one or more entities that reference those one or more data objects. The full computed state may be required, in some examples, by an entity data consumer, such as the data consumer 108.

As noted above, a consumer as described herein can be any suitable data consumer. One example of a data consumer—which may be the data consumer 108—is an indexing service for a search function of the multi-platform computing environment 102. As may be appreciated, to provide an accurate searchable index, an indexing service may be required to receive as input a full state of an entity, such as a document entity of a documentation service.

As with other services or functions of the multi-platform computing environment 102, the data consumer 108 may be an instance of software instantiated by cooperation of a processor resource and memory resource, which may be physical or virtual and may be the same as or different from the resource allocations 104a supporting the software platform 104. For simplicity of illustration, the resource allocations 108a are shown as supporting the data consumer 108, but it may be appreciated that this is merely one example.

As such, as with other embodiments described herein, the multi-platform computing environment 102 may also include a pool of worker nodes 110 configured to pull computational work items from a queue maintained by the backend application instance (or at least accessible to the backend application instance).

More particularly, in response to receiving an update to a data object from the frontend application instance on the client device 106, the backend application instance of the software platform 104 can be configured to determine one or more entities that are associated with that updated data object. For example in a documentation system context, if the user of the client device 106 changes a spelling of a name in a human resources database, many different document entities may be implicated.

Once the backend application instance determines which entities are implicated by a change to a particular data object or data item, a corresponding set of work items can be created and appended to a work item queue such as described above. Each work item can include an identifier (e.g., a UUID, an index number, a hash value, and so on; these examples are not exhaustive) that identifies a particular entity implicated by the changed data item or object. In addition, in many embodiments, each new work item also includes a version number corresponding to a version of the referenced entity.

Thereafter, at a later time which may be selected based on the data consumer 108 (in some embodiments) a worker node instance of the worker node pool 110 can access or request a new work item from the work item queue. Once obtained by the worker node, the worker node can determine whether the version number of the associated entity is the most-current version number of that entity. In other words, if the entity is referenced in more than one work item in the work item queue, the worker node may determine which among those nodes is the most current. In other cases, version tracking may not be required; a worker node may be configured to simply detect whether any other work item references the same entity. If a single entity is referenced more than once in more than one work item, all but one of the work items can be discarded so that the full state of the referenced entity is only computed once.

As noted above, once a full state of an entity is computed (e.g., by accessing all data objects associated with the entity from data stores of the software platform 104), it may be forwarded, served, or otherwise made available to the data consumer 108.

In many embodiments, some entities may have states computed at shorter intervals than other entities. In some cases, some data consumers may require certain entity states to be computed at shorter intervals than other entity states. In any case, for embodiments described herein, intervals during which a particular entity's full state is not computed (e.g., computation is deferred to a later time) may be specific to a particular data object or data object class (e.g., certain objects or object types are associated with longer deferrals of full entity state computations), a particular time of day (e.g., during peak business hours, full state computations may be performed more rapidly), a particular use or access history of a data object or entity (e.g., the more frequently an object or entity changes, the less frequently a full state may be computed), a particular consumer (e.g., a notification service may require less frequent full state computations than an indexing service), and so on. Deferral durations may vary from embodiment to embodiment, user to user, entity to entity, consumer to consumer, data object to data object, data object class to data object class, time of day, time of year (e.g., quarter start, quarter end, and so on) by administrative setting, by an amount determined by a machine learning model training against prior update intervals (as one example), and so on. Many implementations are possible.

These foregoing embodiments depicted in FIG. 1 and the various alternatives thereof and variations thereto are presented, generally, for purposes of explanation, and to facilitate an understanding of various configurations and constructions of a multiplatform computing environment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
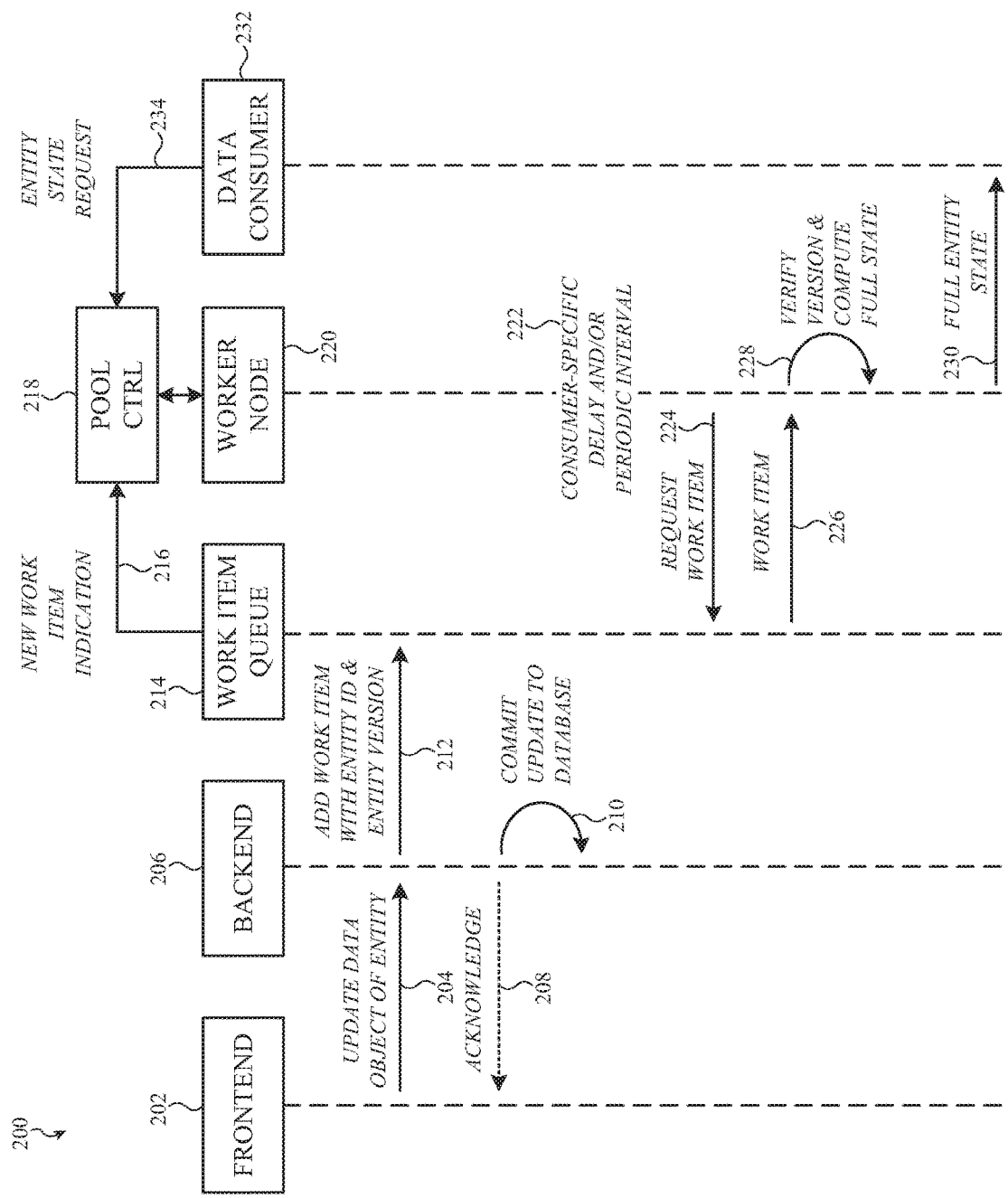
FIGS. 2A-2B each depict a signal flow diagram corresponding to a method of efficiently deferring computation of entity states in a software platform.
Figure 2B:
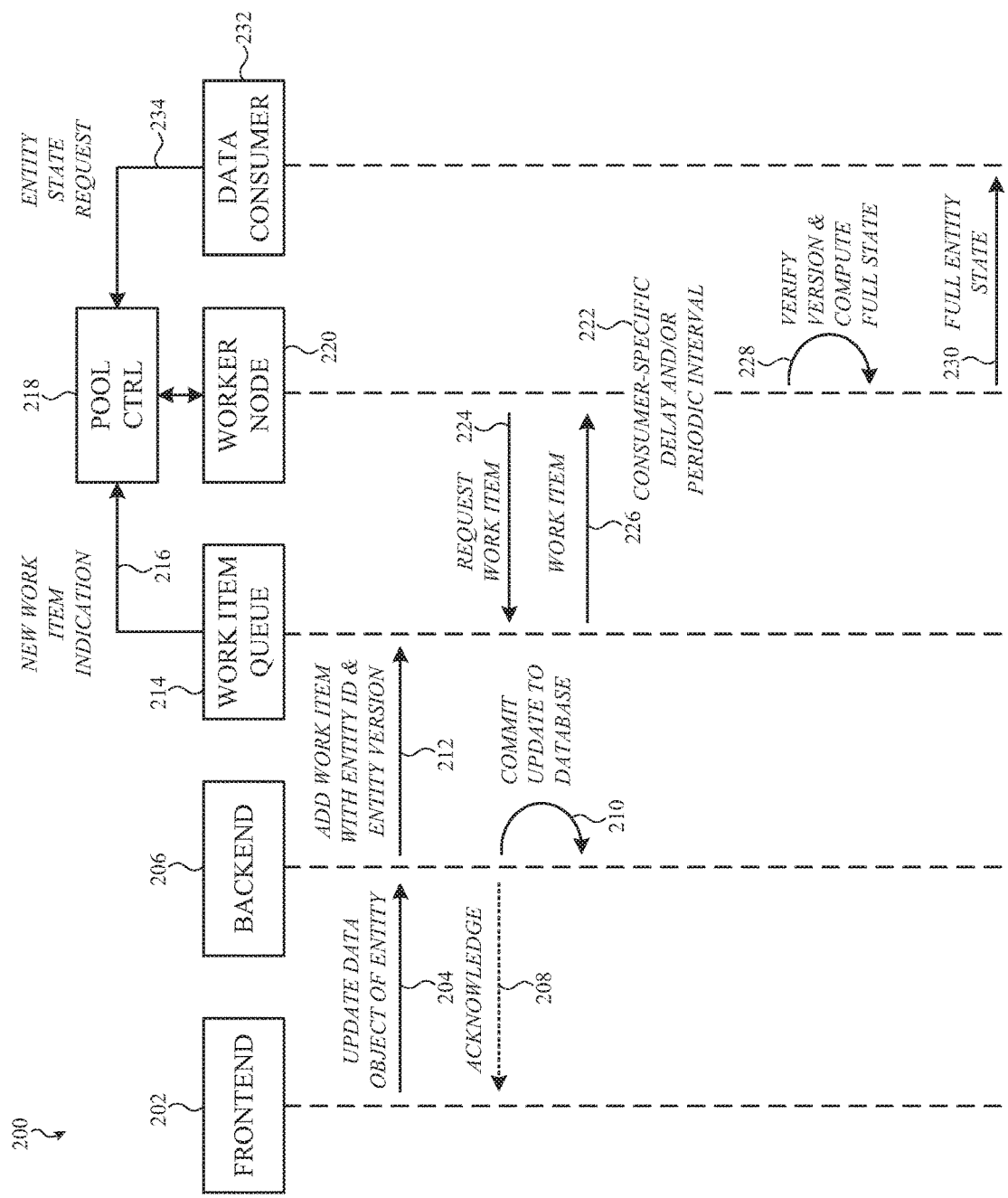

FIGS. 2A-2B each depict a signal flow diagram corresponding to a method of efficiently deferring computation of entity states in a software platform, such as the software platforms described in reference to FIG. 1. In this example, the system 200 can perform several operations to advance methods described herein.

For example, as with other embodiments described herein, a method executed by the system 200 can begin by receiving input from a client device executing a frontend application instance, such as the frontend 202. The frontend 202 can be configured to communicate a structured data object 204, over any suitable protocol (e.g., TCP, UDP, HTTP, and so on) to a backend 206. The structured data object 204 includes information identifying a data object changed by a user of the frontend 202.

The structured data object 204 can take any suitable form or format. In many cases, the frontend 202 is configured to transmit the structured data object 204 to the backend 206 by complying with an API implemented by the backend 206. In some cases, the backend 206 is configured to acknowledge via an acknowledgement 208 to the frontend 202 that the structured data object 204 was received; this is not required of all embodiments.

Upon receiving the structured data object 204, the backend 206 can be configured to perform two operations. The backend 206 can first commit by a database transaction 210 the change identified in the structured data object 204 to a database, table, store, or lake of the backend 206. In addition, as described above, the backend 206 can create one or more work items, collectively represented by the work item 212, that identifies any entities of the backend 206 implicated by the change(s) identified in or by the structured data object 204. In many cases, the backend 206 can be configured to increment a version number associated with each entity and include the incremented version number in each respective work item, but this is not required of all embodiments.

The work item 212 can be added to a work item queue 214 that is periodically accessed by one or more worker nodes, such as described above. In some embodiments, the work item queue 214 and/or the backend 206 can be configured to send a notification 216 to notify a worker node pool controller 218 that a new item (or more than one work item) has been added to the work item queue 214.

The worker node pool controller 218 can thereafter instantiate, provision, or otherwise create one or more worker nodes (if one or more worker nodes are not already instantiated), such as the worker node 220.

Thereafter, the worker node 220 can be configured to wait for a period of time. The period of time (the deferral period 222) may be based on a consumer associated with one or more entities. In other cases, the deferral period may be based on a repeating interval (e.g., every 5 minutes, every 20 minutes, every 2 days, every 2 weeks, every quarter, and so on). In yet other examples, the deferral period may be schedule based on a time of day or a particular timestamp. These examples are not exhaustive; many deferral periods are possible.

Once the deferral period is expired, the worker node 220 can obtain a work item from the work item queue 214. In some cases, the worker node 220 submits a request 224 to the work item queue 214. In other cases, the worker node pool controller 218 can provide the worker node 220 with a particular work item or may provide or release an event that causes the worker node 220 to pop an item from the work item queue 214 for processing.

Independent of how a work item is obtained by the worker node 220, the worker node 220 may receive a work item 226.

Upon receiving the work item 226, the worker node 220 may verify that the version of the entity or entities referenced in the work item are current. In some cases, the worker node 220 traverses the entire work item queue to compare the work item 226 against other work items still in the queue. In other cases, the worker node 220 queries either the work item queue 214, the backend 206, or the worker node pool controller 218 to determine whether other work items exist that reference the same entity. Once the worker node 220 determines that the work item 226 references the most current version of the associated entities, the worker node 220 can compute the full state of each associated entity.

The computed full states can be represented in a structured data object 230 which may be transmitted, served, or otherwise made accessible to a data consumer 232.

As a result of this construction, the computationally expensive task of computing a full state of an entity associated with a particular software platform may be deferred until a time at which the full state is actually needed by a data consumer such as the data consumer 232.

As noted above, the deferral period may vary from embodiment to embodiment, data object to data object, user to user, platform to platform, entity to entity, entity type to entity type, data object type to data object type, and so on. Each of these may be used to inform a particular deferral period, interval, or other characteristic or attribute.

In some embodiments, the data consumer 232 may be configured to request an entity state by submitting a request 234 for a fully computed entity state to the worker node pool controller 218 and/or the backend 206.

In yet other embodiments, such as shown in FIG. 2B, the work item 226 may itself inform the worker node 220 how long to defer computation of a particular full state. More specifically, FIG. 2B depicts receiving the work item 226 prior to implementing the deferral period 222.

These foregoing embodiments depicted in FIGS. 2A-2B and the various alternatives thereof and variations thereto are presented, generally, for purposes of explanation, and to facilitate an understanding of various configurations and constructions of a deferred computation system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
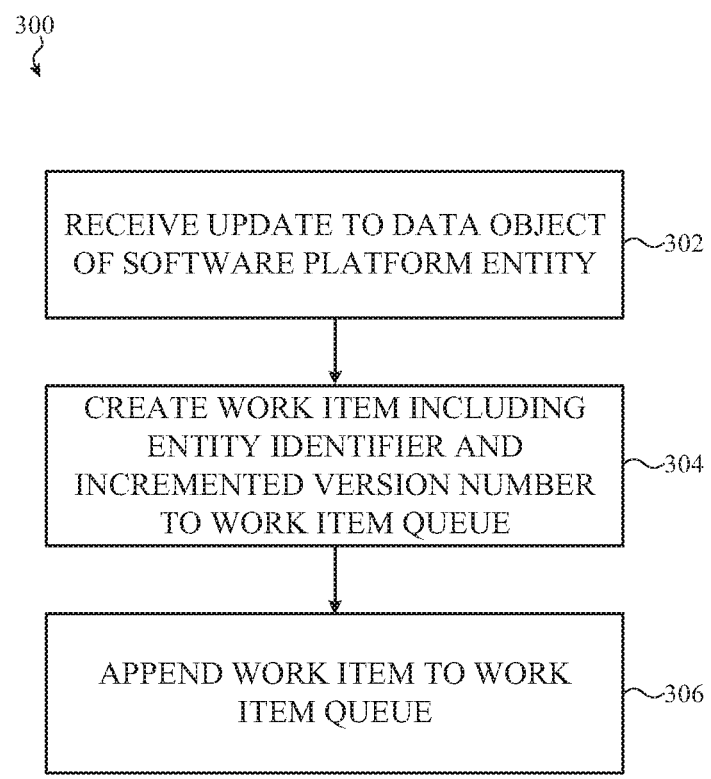
FIG. 3 is a flowchart that corresponds to a method of operating a backend instance of a software platform configured for deferred computation of entity states.

FIG. 3 is a flowchart that corresponds to a method of operating a backend instance of a software platform configured for efficiently-deferred computation and guaranteed delivery of entity states.

The method 300 can be performed by any suitable hardware or software or combination thereof. In many examples, the method 300 is performed by a backend application instance, such as described herein.

The method 300 includes operation 302 at which an update to a data object is received. The data object is, or may be, associated with or to an entity of a particular software platform. As noted above, the update can be provided by a user operating a frontend of the software platform. In other cases, an update may be automatically provided (e.g., a data object may be updated periodically The update may be provided by a user operating a frontend application instance in communication with the backend application instance. For example, a user providing input to a graphical user interface of the frontend may instruct the software platform, via the graphical user interface, to commit a change to a particular data object, such as a string of text associated with a particular document or set of documents. Other changes can include, but may not be limited to: modifying a format of a document; updating a setting or preference; inserting a media file; changing a status of a tracked item, such as a task or issue or bug report; creating metadata for a particular data object by interacting with that object; and so on. These foregoing examples are not exhaustive.

The method 300 also includes operation 304 at which a work item is created. As with other embodiments described herein, the work item can include an identifier of an associated entity (e.g., UUID, hash, and so on) and, optionally a version number associated with that entity.

The method 300 thereafter advances to operation 306 at which the work item is appended to or otherwise added to a work item queue for further processing by a worker node, such as described herein. The work item queue can take any suitable form or format; in some cases the work item queue may be a data structure maintained in a memory of a backend system as described herein. In other cases, the work item queue may be a queue of events in an event-driven system.

Figure 4:
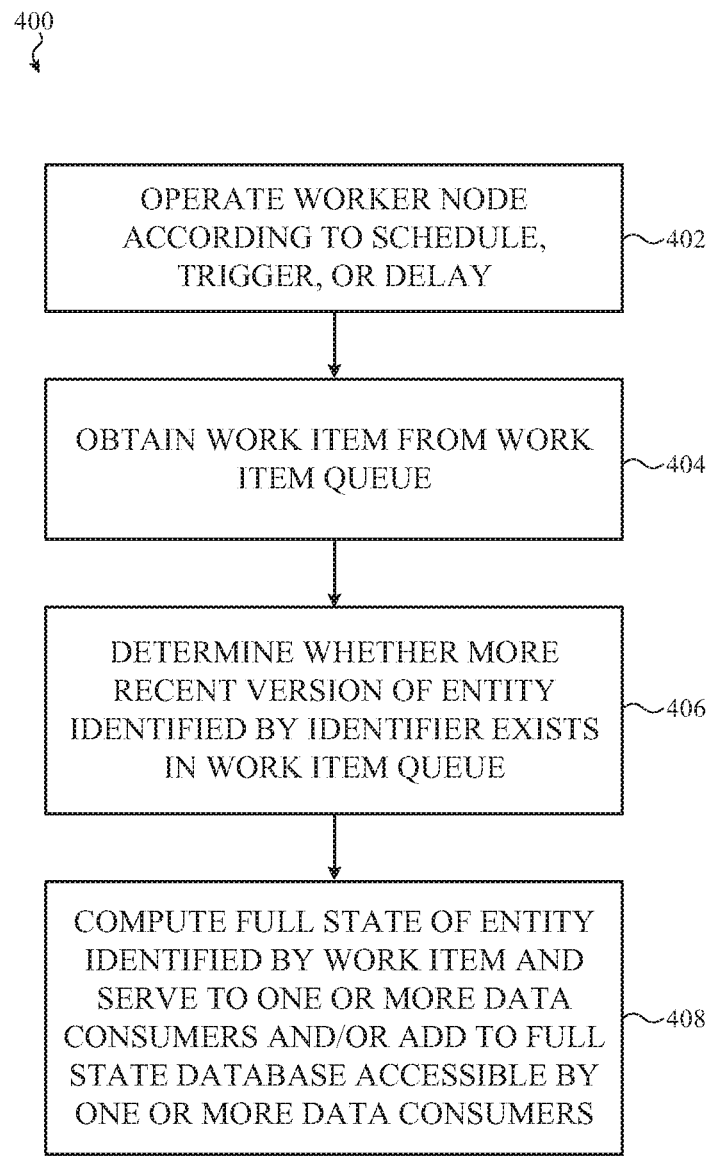
FIG. 4 is a flowchart that corresponds to a method of operating a worker node instance to compute, on a deferred basis, one or more entity states for a software platform.

FIG. 4 is a flowchart that corresponds to a method of operating a worker node instance to compute, on a deferred basis, one or more entity states for a software platform.

As with the method 300, the method 400 can be performed by any suitable hardware or software or combination thereof. In many examples, the method 400 is performed by a worker node instance, such as described herein.

The method 400 includes operation 402 at which one or more worker nodes among a pool of worker nodes are operated along a particular schedule and/or to implement a particular deferral period (which as noted above, may vary from embodiment to embodiment).

The method 400 thereafter advances to operation 404 at which a work item is obtained from a work item queue. The work item may be requested by a worker node or a worker node pool controller. In other cases, the work item may be pushed to a particular worker node. In other cases, the worker node may obtain the work item in another manner.

Thereafter at operation 406, it may be determined which is the most current version of referenced entities among all work items in the work item queue that reference the same entity.

Thereafter, at operation 408, a full state of the referenced entity can be computed and stored in a database (e.g., a cache) that can be accessed at a later time by one or more data consumers as described herein.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As used herein, the term "processing resource" refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

More generally, as described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, as described herein, the term "memory" or "memory resource" refers to any software and/or hardware-implemented data storage device or circuit physically and/or structurally configured to durably store one or more structured or unstructured objects. This term is meant to encompass a single memory unit, database, table, data store, data lake, or other data storage device or apparatus suitably configured to store digital data.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Further, although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A system for buffering asynchronous updates to a set of lower-level data objects that collectively define a document entity of a software platform before serving a structured data representation of a current full computed state of the document entity to a consumer of the current full computed state of the document entity, the system comprising:
    a host server comprising:
        a memory storing an executable asset; and
        a processor operably coupled to the memory and configured to retrieve the executable asset from the memory to instantiate:
            an instance of a backend application supporting the software platform and configured to communicably couple over a network to the consumer, the backend application configured to:
                receive an update to a lower-level data object associated with the document entity;
                in response to receiving the update, cause the update to the lower-level data object to be committed to a backend database of the software platform; and
                after committing to the backend database:
                    increment a version number associated with the document entity; and
                    create a work item comprising an identifier identifying the document entity and the version number and add the work item to a work item queue; and
            a worker node instance configured to await expiration of a time interval associated with the consumer, and thereafter:
                retrieve the work item from the work item queue;
                in accordance with determining that the version number is not the highest version number among all work items in the work item queue that comprise the identifier, discarding the work item and deferring computation of the full computed state of the document entity to a later time;
                in accordance with determining that the version number is the highest version number among all work items in the work item queue that comprise the identifier, computing the current full computed state of the document entity as the structured data representation; and
                in response to completing computation of the current full computed state of the document entity serving the structured data representation to the consumer.

2. The system of claim 1, wherein:
    the update to the data object associated with the document entity is received by the backend application in response to an input provided by a user to a frontend application associated with the software platform; and
    the software platform is a documentation system and the consumer is a search engine service.

3. The system of claim 1, wherein the software platform is a documentation system and the consumer is a frontend application instance executing at a client device.

4. The system of claim 1, wherein the worker node is instantiated in response to an instruction by the backend application.

5. The system of claim 1, wherein the worker node is instantiated by a server computer separate from the host server.

6. The system of claim 1, wherein the worker node is configured to serve the current full computed state of the document entity to the consumer a second time to ensure delivery.

7. The system of claim 1, wherein the document entity is a project tracked by an issue tracking system and the data object is a task associated with the project.

8. A method for deferring computation of a current full computed state of a document entity of a software platform, the document entity constructed from a set of lower-level data objects, the method comprising:
    receiving, at a backend application instance of the software platform instantiated by cooperation of a processor and a memory, an update to a lower-level data object of the set of lower-level data objects associated with the document entity;
    causing, by the backend application instance, the update to the data object to be committed to a backend database of the software platform;

retrieving, by the backend application instance, from a datastore, a version number associated with the document entity;

incrementing, by the backend application instance, the version number associated with the document entity;

retrieving or creating an identifier identifying the document entity;

creating a work item comprising a first attribute comprising the version number and a second attribute comprising the identifier;

inserting the work item into a work item queue;

retrieving the work item from the work item queue after expiration of a selected time interval by a worker node instance instantiated by the backend application instance; and determining by the worker node instance whether the version number of the retrieved work item is the highest version number of all work items that comprise the same identifier in the work item queue and:

in accordance with a determination that the version number of the retrieved work item is the highest version number, retrieving each lower-level data object of the set of lower-level data objects from the backend database in order to compute the current full computed state of the document entity, thereafter transmitting the current full computed state to a consumer of the full computed state of the document entity; and in accordance with a determination that the version number of the work item is not the highest version number, deferring computation of the full computed current state of the document entity by discarding the work item.

9. The method of claim 8, wherein:

the lower-level data object is a first lower-level data object;

the update is a first update;

the version number is a first version number;

the work item is a first work item; and the method comprises:

receiving a second update to a second lower-level data object of the set of lower-level data objects associated with the document entity;

causing the second update to the second lower-level data object to be committed to the backend database of the software platform;

incrementing the first version number associated with the document entity to a second version number;

retrieving, by the backend application instance, the identifier identifying the document entity; and creating a second work item comprising a third attribute comprising the second version number and a fourth attribute comprising the identifier.

10. The method of claim 8, wherein the software platform is a documentation platform and the current full computed state of the document entity comprises a document of the documentation platform.

11. The method of claim 10, wherein the lower-level data object comprises a paragraph of the document.

12. The method of claim 8, wherein the consumer is a search engine service associated with the software platform.

13. A system architecture for reducing computational load associated with computation of a current full computed state of a document entity of a software platform, the document entity constructed from a set of lower-level data objects, the system architecture comprising:

a memory storing an executable asset; and a processor operably coupled to the memory and configured to retrieve the executable asset from the memory to instantiate an instance of a worker node configured to:

await expiration of a selected time interval;

after expiration of the selected time interval, access a work item queue comprising two or more work items;

popping a work item from the work item queue, the work item comprising an identifier identifying the document entity and a version number identifying a version of the document entity;

in accordance with determining that the version number is not the highest version number among all items in the work item queue that comprise the identifier, discarding the work item;

in accordance with a determination that the version number is the highest version number among all work items in the work item queue that comprise the identifier, computing the full state of the document entity; and in response to completing computation of the full state of the document entity serving the current full computed state of the document entity to a data consumer communicably coupled to the software platform.

14. The system architecture of claim 13, wherein the worker node instance is one of a set of worker node instances instantiated by the processor.

15. The system architecture of claim 13, wherein the work item queue is instantiated by a backend application instance of the software platform.

16. The system architecture of claim 13, wherein the processor is configured to instantiate a backend application instance of the software platform.

17. The system architecture of claim 13, wherein the data consumer is a search engine service.

18. The system architecture of claim 13, wherein the software platform is a documentation platform and the document entity is a document of the documentation platform.

* * * * *